US012307894B2

(12) United States Patent
Chiba et al.

(10) Patent No.: US 12,307,894 B2
(45) Date of Patent: May 20, 2025

(54) AUTOMATED PARKING MANAGEMENT DEVICE AND AUTOMATED PARKING MANAGEMENT METHOD

(71) Applicant: TOYOTA JIDOSHA KABUSHIKI KAISHA, Toyota (JP)

(72) Inventors: Hiroya Chiba, Fuji (JP); Tatsuya Sugano, Shizuoka-ken (JP); Ryuji Okamura, Gotemba (JP); Noriyuki Tsuruoka, Susono (JP); Daisuke Kakuma, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/532,486

(22) Filed: Dec. 7, 2023

(65) Prior Publication Data

US 2024/0257639 A1 Aug. 1, 2024

(30) Foreign Application Priority Data

Feb. 1, 2023 (JP) ................................ 2023-014140

(51) Int. Cl.
*G08G 1/14* (2006.01)
*G06Q 50/40* (2024.01)

(52) U.S. Cl.
CPC ............... *G08G 1/14* (2013.01); *G06Q 50/40* (2024.01)

(58) Field of Classification Search
CPC .......... G08G 1/14; G08G 1/145; G06Q 50/40; G06Q 10/02; G06Q 50/30; B60W 30/06; B62D 15/0285; G05D 2201/0213
See application file for complete search history.

(56) References Cited

U.S. PATENT DOCUMENTS 9,230,440 B1 * 1/2016 Penilla .................... B60L 53/66
2021/0295402 A1 9/2021 Noguchi et al.
(Continued)

FOREIGN PATENT DOCUMENTS

JP 2010-000922 A 1/2010
JP 2021-049868 A 4/2021
JP 2021-149713 A 9/2021

OTHER PUBLICATIONS

Ahmad Shekib Iqbal, Determining Parking Demand and Locating Parking Areas Using Geographic Analytics Methods, 2021, p. 1-5 (Year: 2021).*

*Primary Examiner* — Ibrahim N El-Bathy
(74) *Attorney, Agent, or Firm* — Dinsmore & Shohl LLP

(57) ABSTRACT

An automated parking management device includes a storage device and a processor that performs an organization processing for organizing an automated parking location of a vehicle in a parking lot. In the organization processing, the processor calculates a degree of anti-theft necessity for a loaded vehicle and a load scheduled vehicle for each vehicle. The processor calculates a degree of theft resistance for each parking spot based on a map information of the parking lot, a location information of the loaded vehicle, and a location information of the load scheduled vehicle. The processor determines an automated parking location of the loaded vehicle and the load scheduled vehicle based on the degree of anti-theft necessity and degree of theft resistance such that a vehicle with a higher degree of anti-theft necessity is parked in the parking spot with a higher degree of theft resistance.

5 Claims, 6 Drawing Sheets

(56) References Cited

U.S. PATENT DOCUMENTS

| | | | | |
|---|---|---|---|---|
| 2023/0118743 A1* | 4/2023 | Patel | G06Q 10/02 | 705/5 |
| 2023/0234561 A1* | 7/2023 | Kim | G08G 1/096838 | |

* cited by examiner

FIG. 3A

| CASE | 51 | RTP | |
|---|---|---|---|
| 1 | MORE THAN 3 DAYS | HIGH | 3 |
| 2 | MORE THAN 1 DAY | MEDIUM | 2 |
| 3 | LESS THAN 1 DAY | LOW | 1 |

FIG. 3B

| CASE | 52 | RTP | |
|---|---|---|---|
| 1 | GRADE4 (LUXURY VEHICLE) | EXTREMELY HIGH | 4 |
| 2 | GRADE3 | HIGH | 3 |
| 3 | GRADE2 | MEDIUM | 2 |
| 4 | GRADE1 | LOW | 1 |

FIG. 3C

| CASE | 53 | RTP | |
|---|---|---|---|
| 1 | YES | HIGH | 3 |
| 2 | NO | LOW | 1 |

FIG. 3D

| CASE | 54 | RTP | |
|---|---|---|---|
| 1 | YES | EXTREMELY HIGH | 4 |
| 2 | NO | LOW | 1 |

FIG. 3E

| VEHICLE | 51 | 52 | 53 | 54 | RTP |
|---|---|---|---|---|---|
| 4 | 1DAY | **GRADE4** | YES | NO | **4** |
| 2A | 1DAY | **GRADE2** | NO | NO | **2** |
| 2B | **2DAYS** | GRADE1 | NO | NO | **2** |
| 2C | **1DAY** | **GRADE1** | **NO** | **NO** | **1** |
| 2D | **3DAYS** | GRADE2 | NO | NO | **3** |
| 2E | 1DAY | **GRADE2** | NO | NO | **2** |

FIG. 4A

| CASE | TR | | SITUATION AROUND PARKING SPOT PS |
|---|---|---|---|
| 1 | EXTREMELY HIGH | 4 | THERE ARE VEHICLES IN ALL DIRECTIONS, FRONT, REAR, LEFT AND RIGHT |
| 2a | HIGH | 3 | THERE ARE VEHICLES IN FRONT AND REAR DIRECTIONS |
| 2b | | 3 | THERE ARE VEHICLES LESS THAN PREDETERMINED DISTANCE TO LEFT OR RIGHT |
| 3 | MEDIUM | 2 | THERE ARE VEHICLES OVER PREDETERMINED DISTANCE TO LEFT OR RIGHT |
| 4a | LOW | 1 | THERE IS VEHICLE IN ONLY ONE DIRECTION, EITHER FRONT, REAR, LEFT OR RIGHT |
| 4b | | | THERE IS NO VEHICLE IN ANY DIRECTION OF FRONT, REAR, LEFT AND RIGHT |

FIG. 4B

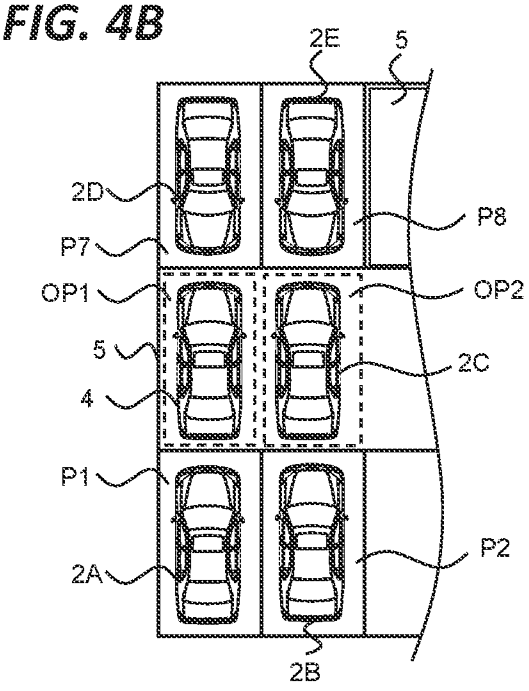

| VEHICLE | RTP | | PS | TR |
|---|---|---|---|---|
| | YESTERDAY | TODAY | | |
| 2A | MEDIUM | MEDIUM | P1 | HIGH |
| 2B | MEDIUM | HIGH | P2 | MEDIUM |
| 2C | LOW | LOW | P3 | LOW |
| ... | ... | ... | ... | ... |

| VEHICLE | PS | TR |
|---|---|---|
| 2A | P2 | HIGH |
| 2B | P1 | MEDIUM |
| 2C | P3 | LOW |
| ... | ... | ... |

AUTOMATED PARKING MANAGEMENT DEVICE AND AUTOMATED PARKING MANAGEMENT METHOD

CROSS-REFERENCE TO RELATED APPLICATION

The present application claims priority under 35 U.S.C. § 119 to Japanese Patent Application No. 2023-014140, filed on Feb. 1, 2023, the contents of which application are incorporated herein by reference in their entirety.

BACKGROUND

Technical Field

The present disclosure relates to a device and a method for managing an automated parking of a vehicle in a parking lot.

Background Art

JP 2021049868 A discloses a technique for performing an automated load processing of an AVP (Automated Valet Parking) vehicle in a parking lot with a mix of AVP vehicles and non-AVP vehicles. In the related art, when performing the automated load processing, it is determined whether a vehicle parked next to an empty space where a subject vehicle is scheduled to park is an AVP vehicle. If the parked vehicle is determined to be the AVP vehicle, a parking interval between the parked AVP vehicle and the subject vehicle is narrower than a case where the parked vehicle is determined to be the non-AVP vehicle.

SUMMARY

Consider a case where the AVP vehicle is parked in a parking lot other than a home parking lot, for example, a parking lot of a commercial facility, a parking lot of an accommodation facility, or a parking lot of an airport. Here, in general, vehicles with high selling prices, rare and popular vehicles tend to be at higher risk of being stolen while parked. Therefore, it is likely that users of the vehicles with such a high risk of theft take adequate precautions against theft in their home parking lot. It is also expected that they expect adequate protections against theft for parking lot other than home parking lot. Therefore, there is room for technological development to meet these expectations.

An object of the present disclosure is to provide a technique capable of enhancing anti-theft measures in parking lot other than home parking lot.

A first aspect relates to an automated parking management device for managing an automated parking of a vehicle in a parking lot. The automated parking management device includes a storage device that has already been loaded in the parking lot and a location information of a scheduled parking spot of a load scheduled vehicle that is scheduled to load in the parking lot and a processor configured to perform an organization processing for organizing an automated parking location of a vehicle in the parking lot. In the organization processing, the processor calculates a degree of anti-theft necessity for the loaded vehicle and the load scheduled vehicle for each vehicle. The processor calculates a degree of theft resistance for each parking spot based on the map information of the parking lot, the location information of the loaded vehicle, and the location information of the load scheduled vehicle. The processor determines an automated parking location of the loaded vehicle and the load scheduled vehicle based on the degree of anti-theft necessity and degree of theft resistance such that a vehicle with a higher degree of anti-theft necessity is parked in the parking spot with a higher degree of theft resistance.

A second aspect relates to an automated parking management device for managing an automated parking of a vehicle in a parking lot. The automated parking management device includes a storage device that stores a map information of the parking lot and a location information of a loaded vehicle that has already been loaded in the parking lot and a processor configured to perform an organization processing for organizing an automated parking location of a vehicle in the parking lot. In the organization processing, the processor calculates a degree of anti-theft necessity for the loaded vehicle for each vehicle. The processor calculates a degree of theft resistance for each parking spot based on the map information of the parking lot and the location information of the loaded vehicle. The processor determines an automated parking location of the loaded vehicle based on the degree of anti-theft necessity and degree of theft resistance such that a vehicle with a higher degree of anti-theft necessity is parked in the parking spot with a higher degree of theft resistance.

A third aspect relates to an automated parking management method for managing an automated parking of a vehicle in a parking lot. The automated parking management method includes performing an organization processing for organizing an automated parking location of a vehicle in the parking lot. In the organization processing, the automated parking management method includes:

- calculating a degree of anti-theft necessity for the loaded vehicle and the load scheduled vehicle for each vehicle;
- calculating a degree of theft resistance for each parking spot based on the map information of the parking lot, the location information of the loaded vehicle, and the location information of the load scheduled vehicle; and
- determining an automated parking location of the loaded vehicle and the load scheduled vehicle based on the degree of anti-theft necessity and degree of theft resistance such that a vehicle a higher degree of anti-theft necessity is parked in the parking spot with a higher degree of theft resistance.

A fourth aspect relates to an automated parking management method for managing an automated parking of a vehicle in a parking lot. The automated parking management method includes performing an organization processing for organizing an automated parking location of a vehicle in the parking lot. In the organization processing, the automated parking management method includes:

- calculating a degree of anti-theft necessity for the loaded vehicle for each vehicle;
- calculating a degree of theft resistance for each parking spot based on the map information of the parking lot and the location information of the loaded vehicle; and
- determining an automated parking location of the loaded vehicle based on the degree of anti-theft necessity and degree of theft resistance such that a vehicle with a higher degree of anti-theft necessity is parked in the parking spot with a higher degree of theft resistance.

According to the present disclosure, the automated parking location of the load scheduled vehicle and the loaded vehicle are organized such that the vehicle with the higher degree of anti-theft necessity is parked in the parking spot with the higher degree of theft resistance. Alternatively, the automated parking location of the loaded vehicle is organized such that the vehicle with the higher degree of anti-theft necessity is parked in the parking spot with the higher degree of theft resistance. This will strengthen anti-theft measures. Thus, users can use the parking lot managed by this disclosure with peace of mind.

BRIEF DESCRIPTION OF DRAWINGS

FIG. 3A is a diagram for explaining a calculation example of a degree of anti-theft necessity according to the first embodiment;

FIG. 3B is another diagram for explaining the calculation example of the degree of anti-theft necessity according to the first embodiment;

FIG. 3C is another diagram for explaining the calculation example of the degree of anti-theft necessity according to the first embodiment;

FIG. 3D is another diagram for explaining the calculation example of the degree of anti-theft necessity according to the first embodiment;

FIG. 3E is another diagram for explaining the calculation example of the degree of anti-theft necessity according to the first embodiment;

FIG. 4A is a diagram for explaining a calculation example of a degree of theft resistance according to the first embodiment;

FIG. 4B is another diagram for explaining the calculation example of the degree of theft resistance according to the first embodiment;

DESCRIPTION OF EMBODIMENT

An automated parking management device and an automated parking management method according to an embodiment of the present disclosure will be described with reference to the appended drawings.

1. First Embodiment

1-1. Outline

Figure 1A:
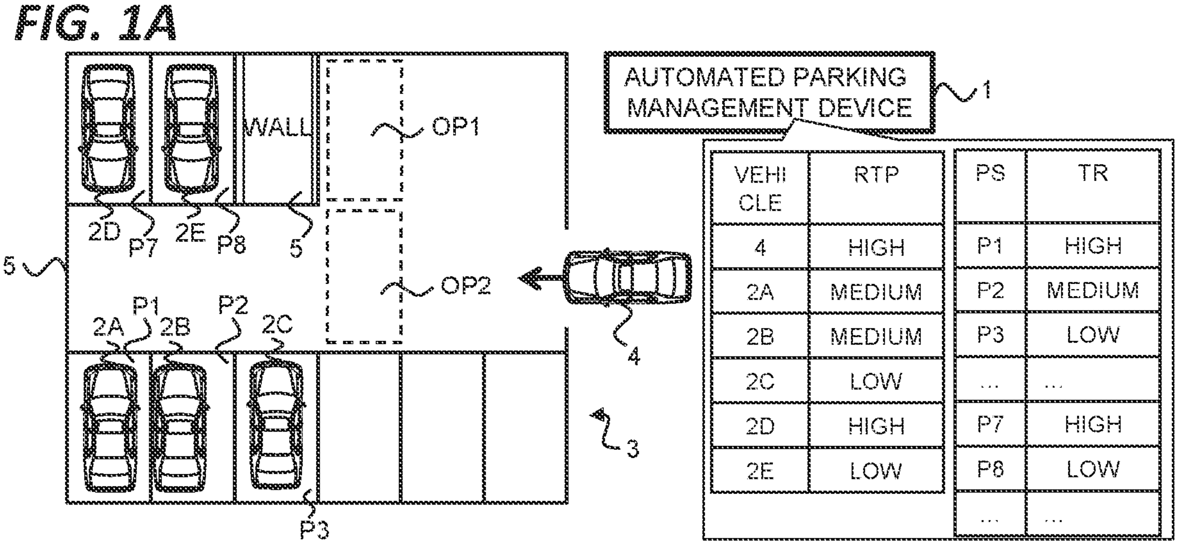
FIG. 1A is a diagram for explaining an outline of an automated parking management device according to a first embodiment.
Figure 1B:
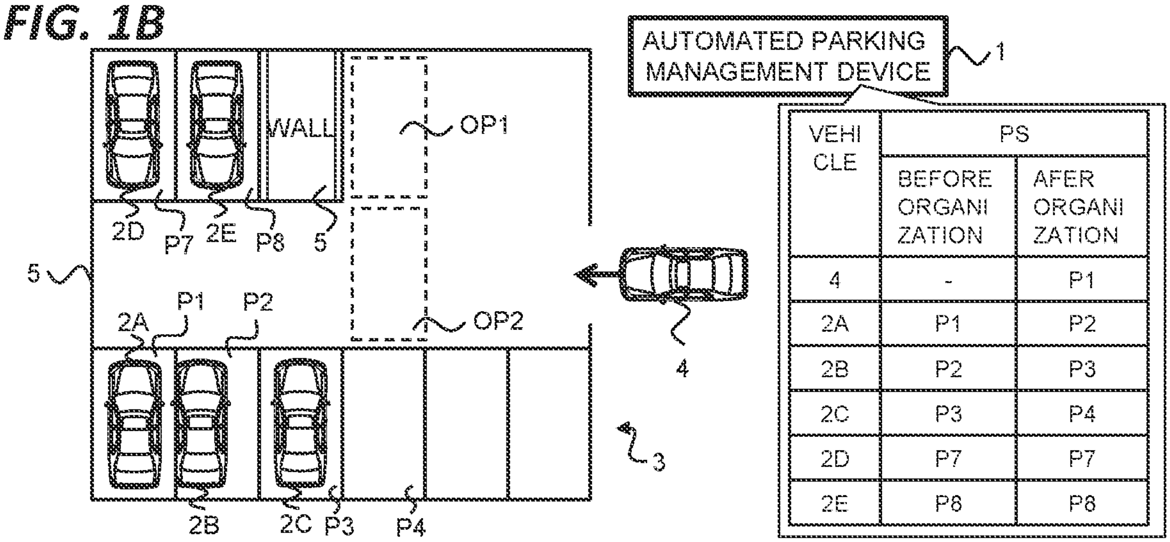
FIG. 1B is another diagram for explaining the outline of the automated parking management device according to the first embodiment.
Figure 1C:
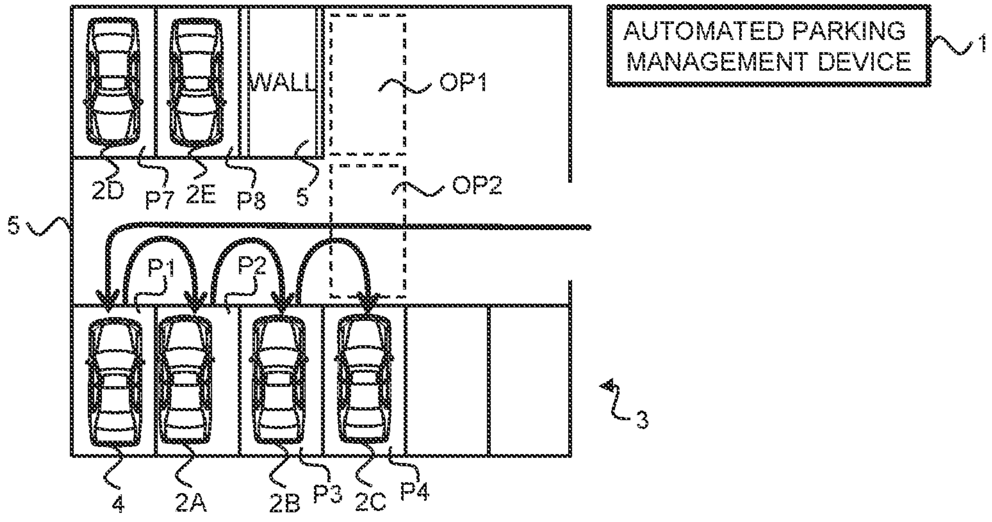
FIG. 1C is another diagram for explaining the outline of the automated parking management device according to the first embodiment.

FIG. 1A, FIG. 1B, and FIG. 1C is a diagram for explaining an outline of an automated parking management device 1 according to a first embodiment. The automated parking management device 1 manages an automated parking location of a vehicle while taking measures to prevent theft of the vehicle parked in a parking lot 3 other than the user's home. As shown in FIG. 1A, the vehicles parked in the parking lot 3 include a loaded vehicles 2 (2A, 2B, etc.) that have already been parked in the parking lot 3 and the load scheduled vehicles 4 scheduled to be parked in the parking lot 3. These vehicles have an automatic load/unload function. The vehicle having the automatic load/unload function is, for example, an automated valet parking (AVP) vehicle. The AVP vehicle may be a vehicle that performs autonomous driving or a vehicle that performs manual driving.

The loaded vehicle 2 and the load scheduled vehicle 4 are parked in a parking spot PS provided in the parking lot 3. The parking spot PS includes a parking facility place inside the parking frame and a parking facility place outside the parking frame. The parking facility in the parking frame is represented by, for example, a parking spot P1, a parking spot P2, or the like. In the example shown in FIG. 1A, the loaded vehicle 2A is parked in the parking spot P1, the loaded vehicle 2B is parked in the parking spot P2, the loaded vehicle 2C is parked in the parking spot P3, the loaded vehicle 2D is parked in the parking spot P7, and the loaded vehicle 2E is parked in the parking spot P8.

On the other hand, examples of the parking place outside the parking frame include a place not partitioned by the parking frame, a path, and the like. The parking place outside the parking frame is represented by OP1, OP2, or the like as illustrated in FIG. 1A.

The parking lot 3 may be configured such that the obstacle 5 is provided around the parking lot 3 or may be configured such that the obstacle 5 is provided inside the parking lot 3. The obstacle 5 is exemplified by a wall, a pillar, and the like.

The automated parking management device 1 takes anti-theft measures for each of the loaded vehicle 2 and the load scheduled vehicle 4. As an example of the theft prevention measure, automated parking locations of the loaded vehicle 2 and the load scheduled vehicle 4 are organized. Specifically, the automated parking locations of the loaded vehicle 2 and the load scheduled vehicle 4 scheduled are organized based on a degree of anti-theft necessity RTP of theft prevention and a degree of theft resistance TR.

The degree of anti-theft necessity RTP is set for each of the loaded vehicle 2 and the load scheduled vehicle 4. The degree of anti-theft necessity RTP of theft prevention is expressed by extremely high (or 4), high (or 3), medium (or 2), low (or 1), or the like. In the example shown in FIG. 1A, the degree of anti-theft necessity RTP set for the load scheduled vehicle 4 scheduled to enter and the loaded vehicle 2D is "high", the degree of anti-theft necessity RTP set for the loaded vehicle 2A and the loaded vehicle is "medium", and the degree of anti-theft necessity RTP set for the loaded vehicle 2C and the loaded vehicle 2E is "low". Details of a calculation example of the degree of anti-theft necessity RTP set for each vehicle will be described later.

The degree of theft resistance TR is set for each parking spot PS. The degree of theft resistance TR is expressed by extremely high (or 4), high (or 3), medium (or 2), low (or 1), or the like. In the example shown in FIG. 1A, the degree of theft resistance TR set for the parking spot P1 and the parking spot P7 is "high", the degree of theft resistance TR set for the parking spot P2 is "medium", and the degree of theft resistance TR set for the parking spot P3 and the parking spot P8 is "low". Details of a calculation example of the degree of theft resistance TR set for each parking spot PS will be described later.

The automated parking management device 1 generates an organization plan for forming the automated parking locations of the loaded vehicle 2 and the load scheduled vehicle 4 based on the degree of anti-theft necessity RTP of the theft prevention and the degree of theft resistance TR. To be more specific, the automated parking management device 1 determines the automated parking location of the loaded vehicle 2 and the load scheduled vehicle 4 such that the vehicle with a higher degree of anti-theft necessity RTP is parked in the parking spot PS with a higher degree of theft resistance TR in the generation of the organization plan. For example, the automated parking management device 1 determines the automated parking location of the load scheduled vehicle 4 to be the parking spot PS of the degree of theft resistance TR corresponding to the degree of anti-theft necessity RTP set in the load scheduled vehicle 4.

Then, the automated parking management device 1 determines whether or not the loaded vehicle 2 is parked in the parking spot PS of the load scheduled vehicle 4 determined in the generation of the organization plan. When the loaded vehicle 2 is not parked in the parking spot PS of the load scheduled vehicle 4, the automated parking management device 1 ends the generation of the organization plan.

On the other hand, when the loaded vehicle 2 is parked in the parking spot PS of the load scheduled vehicle 4, the automated parking management device 1 further generates an organization plan. Specifically, the automated parking management device 1 determines the automated parking location of the loaded vehicle 2 to be another parking spot PS having the degree of theft resistance TR corresponding to the degree of anti-theft necessity RTP set for the loaded vehicle 2.

In the example shown in FIG. 1B, the automated parking location of the loading scheduled vehicle 4 is determined to be the parking spot P2 where the degree of theft resistance TR corresponding to the degree of anti-theft necessity RTP ("high" shown in FIG. 1A) set in the load scheduled vehicle 4 is "high". In this case, the loaded vehicle 2A is parked at the parking spot P1 where the load scheduled vehicle 4 is scheduled to load. Therefore, the automated parking location of the loaded vehicle 2A is determined to be the parking spot P2 having the degree of theft resistance TR of "medium" corresponding to the degree of anti-theft necessity RTP ("medium" shown in FIG. 1A) set to the loaded vehicle 2A.

Further, as shown in FIG. 1B, since the loaded vehicle 2A is parked at the parking spot P2 where the loaded vehicle 2B is scheduled to enter, the automated parking location of the loaded vehicle 2B is determined to be the parking spot P3 where the degree of theft resistance TR corresponding to the degree of anti-theft necessity RTP ("medium" shown in FIG. 1A) set for the loaded vehicle 2B is "medium".

Further, as shown in FIG. 1B, since the loaded vehicle 2B is parked at the parking spot P3 where the loaded vehicle 2C is scheduled to load, the automated parking location of the loaded vehicle 2C is determined to be the parking spot P4 where the degree of theft resistance TR corresponding to the degree of anti-theft necessity RTP ("low" shown in FIG. 1A) set for the loaded vehicle 2C is "low".

As shown in FIG. 1B, since the automated parking locations of the loaded vehicles 2D and 2E are not changed, it is determined that the automated parking locations of the loaded vehicles 2D and 2E are maintained as they are.

After the organization plan is generated, as illustrated in FIG. 1B, the automated parking management device 1 instructs the loaded vehicles 2 (2A, 2B, 2C, 2D, and 2E) and the load scheduled vehicle 4 to automatically park the vehicles at the parking spots PS determined in the generation of the organization plan. Thereafter, as shown in FIG. 1C, the loaded vehicles 2 (2A, 2B, 2C, 2D, and 2E) and the load scheduled vehicle 4 are automatically parked at the parking spot PS instructed by the automated parking management device 1. Hereinafter, a specific example of the automated parking management device 1 according to the first embodiment will be described in detail.

1-2. Specific Example

1-2-1. Configuration Example

Figure 2:
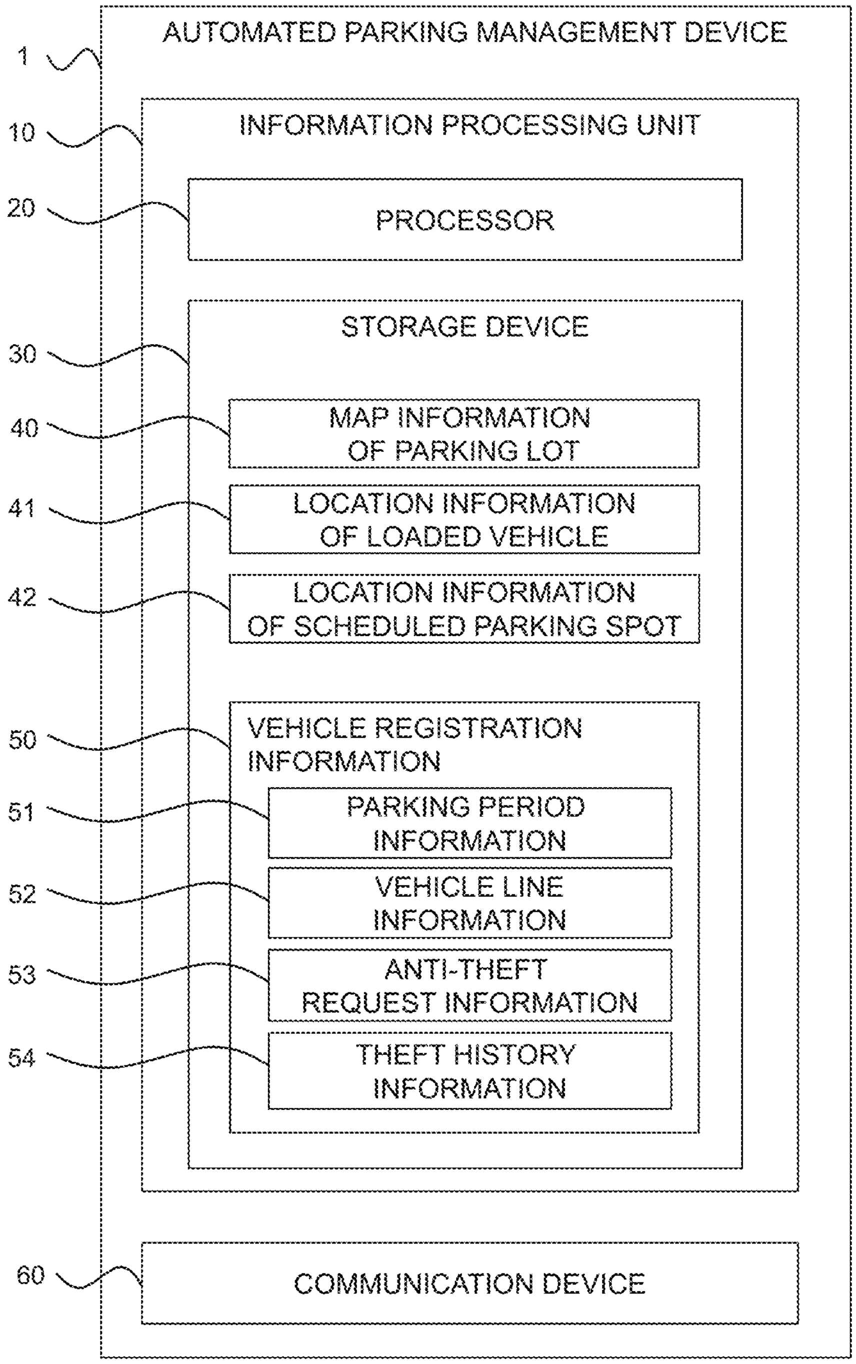
FIG. 2 is a block diagram illustrating a configuration example of the automated parking management device according to the first embodiment.

FIG. 2 is a block diagram showing a configuration example of the automated parking management device 1 according to the first embodiment. The automated parking management device 1 includes an information processing unit 10 and a communication device 60. The information processing unit 10 is a computer that executes an organization process of forming automated parking locations of vehicles (the loaded vehicle 2 and the load scheduled vehicle 4) in the parking lot 3. The information processing unit 10 includes one or more processors 20 (hereinafter, simply referred to as a processor 20) and one or more memory devices 30 (hereinafter, simply referred to as a memory device 30). The processor 20 executes various processes. As the processor 20, a central processing unit (CPU) is exemplified. The memory device 30 stores various kinds of various information necessary for processing by the processor 20. Examples of the memory device 30 include a volatile memory, a non-volatile memory, a hard disk drive (HDD), and a solid state drive (SSD).

The various information stored in the storage device 30 includes map information 40 of the parking lot 3, location information 41 of the loaded vehicle 2, location information 42 of a scheduled parking spot of the load scheduled vehicle 4, and vehicle registration information 50. The various information also includes an automated parking management program. The map information 40 of the parking lot 3 includes positional information of the obstacles 5 (walls, pillars, and the like), positional information of the parking spots PS, and the like. The vehicle registration information 50 includes a parking period information 51, a vehicle line information 52, an anti-theft request information 53, a theft history information 54, and the like.

The automated parking management program is a computer program executed by the processor 20. The processor 20 executes the automated parking management program, and thus the function of the information processing unit 10 is realized. The automated parking management program may be stored in the memory device 30, may be stored in a memory built in the processor 20, or may be recorded in a computer-readable storage medium.

The communication device 60 communicates with the outside of the automated parking management device 1. For example, the communication device 60 communicates with the loaded vehicle 2 and the load scheduled vehicle 4.

1-2-2. Calculation Example of Degree of Anti-Theft Necessity

FIG. 3A, FIG. 3B, FIG. 3C, FIG. 3D, and FIG. 3E is a diagram for explaining a calculation example of the degree of anti-theft necessity RTP of the automated parking management device 1 according to the first embodiment. The automated parking management device 1 calculates the degree of anti-theft necessity RTP for each vehicle on the basis of at least one of the parking period information 51, the vehicle line information 52, the anti-theft request information 53, and the theft history information 54.

First, it is considered that the automated parking management device 1 calculates the degree of anti-theft necessity RTP based on the parking period information 51. In the example shown in FIG. 3A, as shown in case 1, when the parking period information 51 is three days or more, the degree of anti-theft necessity RTP is “high (or 3)”. As shown in Case 2, when the parking period information 51 is one day or more and less than three days, the degree of anti-theft necessity RTP is “medium (or 2)”. Further, as shown in Case 3, when the parking period information 51 is less than one day, the degree of anti-theft necessity RTP is “low (or 1)”. That is, when the automated parking management device 1 calculates the degree of anti-theft necessity RTP for each vehicle based on only the parking period information 51, the degree of anti-theft necessity RTP for a vehicle having a long parking period is higher than that for a vehicle having a short parking period.

Next, it is considered that the automated parking management device 1 calculates the degree of anti-theft necessity RTP based on the vehicle line information 52. In the example shown in FIG. 3B, as shown in case 1, when the vehicle line information 52 is grade 4 (luxury vehicle), the degree of anti-theft necessity RTP is “extremely high (or 4)”. As shown in Case 2, when the vehicle line information 52 is grade 3, the degree of anti-theft necessity RTP is “high (or 3)”. Further, as shown in case 3, when the vehicle line information 52 is grade 2, the degree of anti-theft necessity RTP is “medium (or 2)”. Furthermore, as shown in case 4, when the vehicle line information 52 is grade 1, the degree of anti-theft necessity RTP is “low (or 1)”. That is, when the automated parking management device 1 calculates the degree of anti-theft necessity RTP for each vehicle based on only the vehicle line information 52, the degree of anti-theft necessity RTP of anti-theft for a vehicle of a high vehicle type grade is higher than that for a vehicle of a low vehicle type grade.

Next, it is considered that the automated parking management device 1 calculates the degree of anti-theft necessity RTP of the theft prevention based on the anti-theft request information 53. In the example shown in FIG. 3C, as shown in case 1, when the anti-theft request information 53 is “yes”, the degree of anti-theft necessity RTP is “high (or 3)”. As shown in Case 2, when the anti-theft request information 53 is “none”, the degree of anti-theft necessity RTP is “low (or 1)”. That is, when the automated parking management device 1 calculates the degree of anti-theft necessity RTP for each vehicle based on only the anti-theft request information 53, the degree of anti-theft necessity RTP for the vehicle for which the anti-theft is requested is higher than that of the vehicle for which the anti-theft is not requested.

Finally, it is considered that the automated parking management device 1 calculates the degree of anti-theft necessity RTP based on the theft history information 54. In the example shown in FIG. 3D, as shown in case 1, when the theft history information 54 is “Yes”, the degree of anti-theft necessity RTP is “extremely high (or 4)”. As shown in case 2, when the theft history information 54 is “none”, the degree of anti-theft necessity RTP is “low (or 1)”. That is, when the automated parking management device 1 calculates the degree of anti-theft necessity RTP for each vehicle based on only the theft history information 54, the degree of anti-theft necessity RTP for the vehicle having the theft history is higher than that for the vehicle having no theft history.

Based on this, a specific example of calculating the degree of anti-theft necessity RTP for each vehicle will be described. In the example shown in FIG. 3E, the degree of anti-theft necessity RTP is calculated for each vehicle based on the parking period information 51 shown in FIG. 3A, the vehicle line information 52 shown in FIG. 3B, the anti-theft request information 53 shown in FIG. 3C, and the theft history information 54 shown in FIG. 3D. In this case, the highest value of the degree of anti-theft necessity RTP calculated for each of the parking period information 51, the vehicle line information 52, the anti-theft request information 53, and the theft history information 54 is set as the degree of anti-theft necessity RTP to be set for the vehicle. The degree of anti-theft necessity RTP set for the vehicle is not limited to this, and may be, for example, an average of integrated values of the degree of anti-theft necessity RTP calculated for the parking period information 51, the vehicle line information 52, the anti-theft request information 53, and the theft history information 54.

In the example shown in FIG. 3E, the degree of anti-theft necessity RTP set for the load scheduled vehicle 4 is the highest among the vehicles parked in the parking lot 3, and the degree of anti-theft necessity RTP set for the loaded vehicle 2C is the lowest among the vehicles parked in the parking lot 3.

1-2-3. Calculation Example of Degree of Theft Resistance

The automated parking management device 1 calculates the degree of theft resistance TR for each parking spot PS based on map information 40 of the parking lot 3, location information 41 of the loaded vehicle 2, and location information 42 of a scheduled parking spot of the load scheduled vehicle 4. Specifically, the automated parking management device 1 determines the situation around the parking spot PS for each parking spot PS based on the map information 40 of the parking lot 3, the location information 41 of the loaded vehicle 2, and the location information 42 of the scheduled parking spot of the load scheduled vehicle 4. Thereafter, the automated parking management device 1 sets the degree of theft resistance TR corresponding to the situation around the parking spot PS for each parking spot PS.

In the example shown in FIG. 4A, the situation around the parking spot PS is classified into four cases. Specifically, as shown in Case 1, when the situation around the parking spot PS includes the loaded vehicle 2 or the obstacle 5 that has been loaded in all of the front, rear, left, and right directions, the degree of theft resistance TR is “extremely high (or 4)”. Further, as shown in Case 2a, when the situation around the parking spot PS is that there is the loaded vehicle 2 or the obstacle 5 parked in the front and rear direction, or as shown in Case 2b, when the situation around the parking spot PS is that there is the loaded vehicle 2 or the obstacle 5 parked in the left and right direction within the predetermined distance, the degree of theft resistance TR is “high (or 3)”. Further, as shown in Case 3, when the situation around the parking spot PS includes the loaded vehicle 2 or the obstacle 5 that has been parked and is at a predetermined distance or more in the lateral direction, the degree of theft resistance TR is “medium (or 2)”. Further, as shown in Case 4a, when the situation around the parking spot PS is such that the loaded vehicle 2 or the obstacle 5 is parked only in one of the front, rear, left, and right directions, or as shown in Case 4b, when the situation around the parking spot PS is such that the loaded vehicle 2 or the obstacle 5 is not parked in any of the front and rear directions, the degree of theft resistance TR is “low (or 1)”. The predetermined distance described above means a distance to the extent that a person cannot enter an aperture between the vehicle parked in the parking spot PS and the adjacent vehicle.

The parking spot P1 having the degree of theft resistance TR of "high" shown in FIG. 1 corresponds to the case 2b shown in FIG. 4A.

Here, the parking spot PS that satisfies the condition that the degree of theft resistance TR is "extremely high (or 4)" will be considered. For example, as illustrated in FIG. 4B, when obstacles 5 such as walls are provided around the parking lot 3 and the loaded vehicles 2 are parked in the parking spot P1, the parking spot P2, the parking spot P7, the parking spot P8, the parking spot OP1, and the parking spot OP2, the parking spot OP1 is exemplified as the parking spot PS satisfying the condition that the degree of theft resistance TR is "extremely high (or 4)". That is, the automated parking management device 1 may organize the automated parking locations of the loaded vehicle 2 and the load scheduled vehicle 4 such that the degree of theft resistance TR of the parking place outside the parking frame is "extremely high (or 4)".

As described above, in the automated parking management device 1 according to the first embodiment, the automated parking locations of the loaded vehicle 2 and the load scheduled vehicle 4 are organized based on the degree of anti-theft necessity RTP and the degree of theft resistance TR so that the vehicle having the high degree of anti-theft necessity RTP is parked at the parking spot PS having the high degree of theft resistance TR. This strengthens the anti-theft measure. Therefore, the user can use the parking lot 3 without anxiety.

1-3. Processing Example

Figure 5:
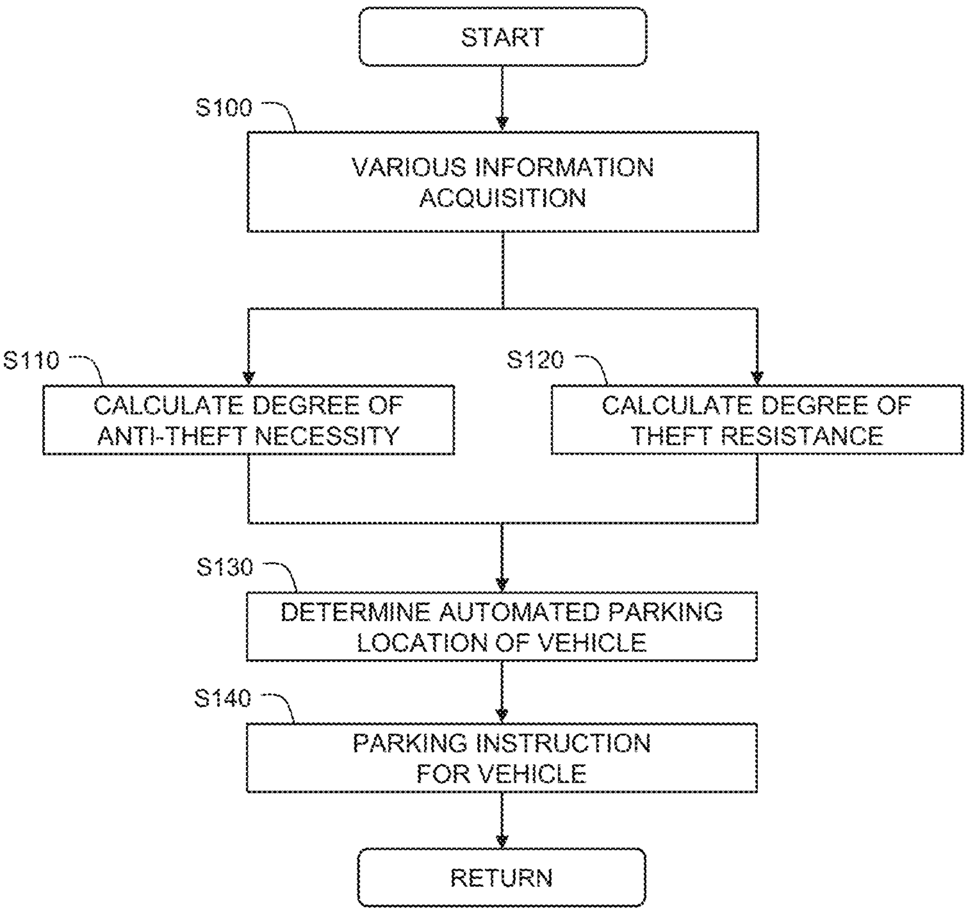
FIG. 5 is a flowchart illustrating a process example of an information processing device according to the first embodiment.

FIG. 5 is a flowchart illustrating an example of the organizing process of the information processing unit 10 in the automated parking management unit 1 according to the first embodiment.

In step S100, the information processing unit 10 acquires various information. Thereafter, the process proceeds to steps S110 and S120, respectively. The various information includes map information 40 of the parking lot 3, location information 41 of the loaded vehicle 2, location information 42 of a scheduled parking spot of the load scheduled vehicle 4, parking period information 51, vehicle line information 52, anti-theft request information 53, and theft history information 54.

In step S110, the information processor 10 calculates the degree of anti-theft necessity RTP for the loaded vehicle 2 and the load scheduled vehicles 4. Thereafter, the process proceeds to step S130.

In step S120, the information processor 10 calculates the degree of theft resistance TR for each parking spot PS based on the map information 40 of the parking lot 3, the location information 41 of the loaded vehicle 2, and the location information 42 of the scheduled parking spot of the load scheduled vehicle 4. Thereafter, the process proceeds to step S130.

In step S130, the information processing unit 10 determines the automated parking location of the loaded vehicle 2 and the load scheduled vehicle 4 such that the vehicle with a higher degree of anti-theft necessity RTP is parked in the parking spot PS with a higher degree of theft resistance TR, based on the degree of anti-theft necessity RTP and the degree of theft resistance TR. Thereafter, the process proceeds to step S140.

In step S140, the information processing unit 10 executes a parking instruction for the vehicle.

2. Second Embodiment

2-1. Outline

In the automated parking management device first embodiment according to the first embodiment described above, the organization target of the automated parking location is the loaded vehicle 2 and the vehicle scheduled to be loaded 4, but the organization target of the automated parking location may be only the loading vehicle 2. According to the automated parking management device 1 of the second embodiment, the automated parking location of only the loaded vehicle 2 is organized. Hereinafter, an outline of the automated parking management device 1 according to second embodiment will be described.

Figure 6A:
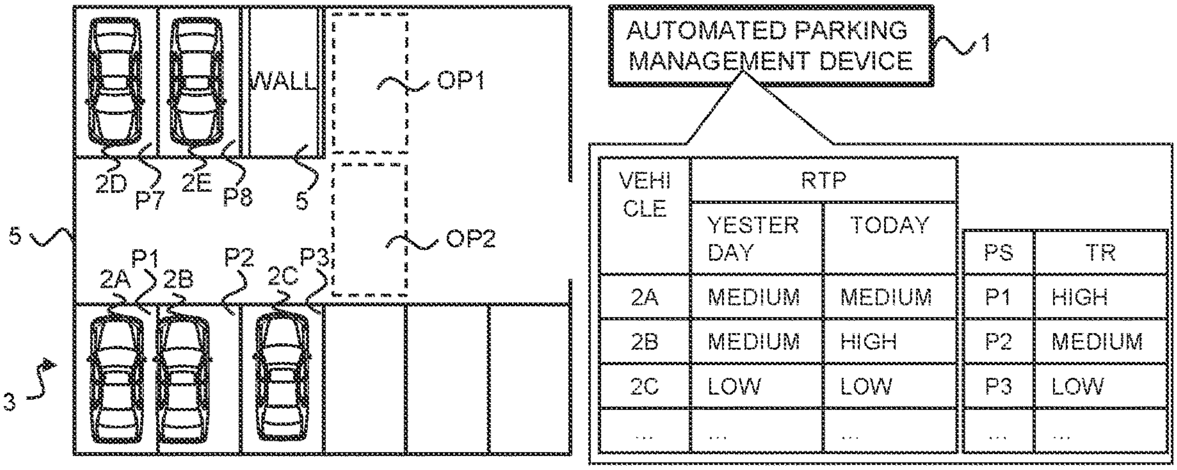
FIG. 6A is a diagram for explaining an outline of an automated parking management device according to a second embodiment.
Figure 6B:
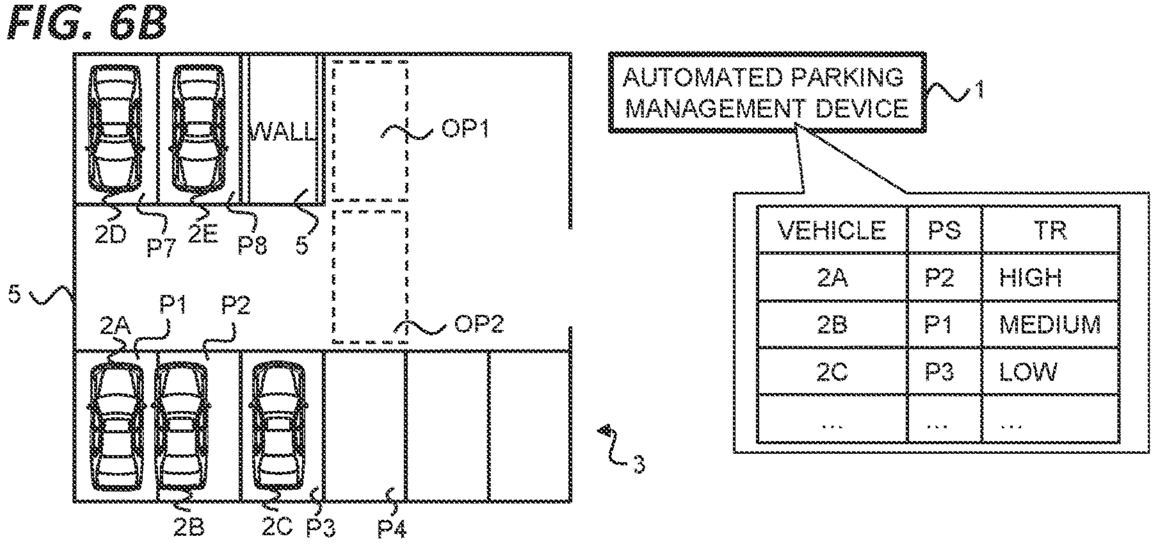
FIG. 6B is another diagram for explaining the outline of the automated parking management device according to the second embodiment.
Figure 6C:
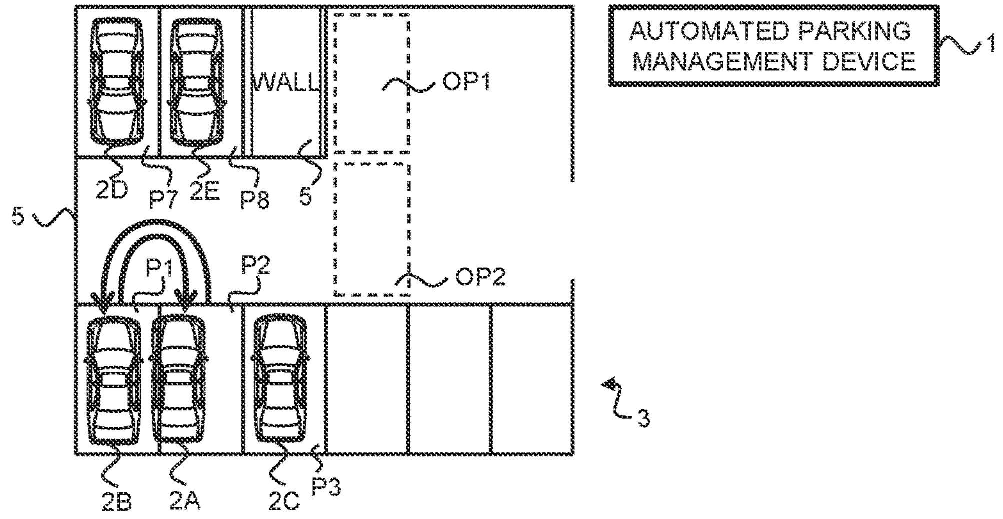
FIG. 6C is another diagram for explaining the outline of the automated parking management device according to the second embodiment.

FIG. 6A, FIG. 6B, and FIG. 6C is a diagram for explaining an overview of the automated parking management device 1 according to the second embodiment. Here, the parking period of the loaded vehicle 2B is considered. For example, when the parking period of the loaded vehicle 2B changes from "2 days" to "3 days", the degree of anti-theft necessity RTP set for the loaded vehicle 2B changes from "medium" to "high" from yesterday to today as shown in FIG. 6A. In this case, the loaded vehicle 2B needs to be parked at a parking spot PS having a "high" degree of theft resistance TR, which is different from the parking spot P2 having a "medium" degree of theft resistance TR at which the loaded vehicle 2B is parked.

Therefore, as shown in FIG. 6B, the automated parking management device 1 organizes the automated parking locations of the loaded vehicle 2B so that the loaded vehicle 2B is parked in the parking spots P1 where the degree of theft resistance TR is "high". However, since the loaded vehicle 2A is parked in the parking spot P1, the loaded vehicle 2A need to be parked in another parking spot PS.

It is considered that the loaded vehicle 2A is parked at another parking spot PS. Since the degree of anti-theft necessity RTP set for the loaded vehicle 2A is "medium", the automated parking management device 1 may organize the automated parking locations of the loaded vehicle 2A so that the loaded vehicle 2A are parked in the parking spot P2 where the degree of theft resistance TR is "medium". That is, the automated parking management device 1 may be organized to interchange the automated parking locations of the loaded vehicle 2A and the loaded vehicle 2B.

As described above, according to the automated parking management device 1 of the second embodiment, the automated parking locations of the loaded vehicle 2 is organized such that the vehicle with a higher degree of anti-theft necessity RTP is parked in the parking spot PS with a higher degree of theft resistance TR. This strengthens the anti-theft measure. Therefore, the user can use the parking lot 3 without anxiety.

2-2. Processing Example

The processing example of the information processing unit 10 in the automated parking management device 1 according to the second embodiment is the same as the processing illustrated in FIG. 5 used in the description of the processing example of the automated parking management device 1 according to the first embodiment described above. Here, points different from the processing example of the automated parking management device first embodiment according to the first embodiment will be described.

In detail, in the information processor 10 of the automated parking management device 1 according to the second embodiment, the various information of the step S100 includes the map information 40 of the parking lot 3, the location information 41 of the loaded vehicle 2, the location information 42 of the scheduled parking spot of the load scheduled vehicle 4, the parking period information 51, the vehicle line information 52, the anti-theft request information 53, and the theft history information 54.

In the information processor 10 of the automated parking management device 1 according to the second embodiment, the processing is performed by replacing the "loaded vehicle 2 and the load scheduled vehicle 4" in the above-described step S110 and step S130 with the "loaded vehicle 2".

Further, in the information processing unit 10 of the automated parking management device 1 according to the second embodiment, the degree of theft resistance TR is calculated for each parking spot PS based on the map information 40 of the parking lot 3 and the location information 41 of the loaded vehicle 2.

What is claimed is:

1. An automated parking management device for managing an automated parking of a vehicle in a parking lot, the automated parking management device comprising:

a storage device that stores a map information of the parking lot, a location information of a loaded vehicle that has already been loaded in the parking lot and a location information of a scheduled parking spot of a load scheduled vehicle that is scheduled to load in the parking lot; and a processor configured to perform an organization processing for organizing an automated parking location of a vehicle in the parking lot, wherein, in the organization processing, the processor is configured to:

automatically calculate a degree of anti-theft necessity for the loaded vehicle and the load scheduled vehicle for each vehicle;

automatically calculate a degree of theft resistance for each parking spot based on the map information of the parking lot, the location information of the loaded vehicle, and the location information of the load scheduled vehicle, the degree of theft resistance for each parking spot is automatically classified into four classes of the degree of the theft resistance, a first class of the degree of the theft resistance is assigned when a situation around the parking spot includes the loaded vehicle that has been loaded in all of the front, rear, left, and right directions, a second class of the degree of the theft resistance is assigned when the situation around the parking spot is that the loaded vehicle is parked in the front and rear direction, or in the left and right direction within a predetermined distance from the parking spot, a third class of the degree of the theft resistance is assigned when the situation around the parking spot includes the loaded vehicle that has been parked and is at the predetermined distance or greater in a lateral direction, and a fourth class of the degree of the theft resistance is assigned when the situation around the parking spot is such that the loaded vehicle is parked only in one of the front, rear, left, and right directions, or is not parked in any of the front and rear directions;

automatically determine an automated parking location of the loaded vehicle and the load scheduled vehicle based on the degree of anti-theft necessity and degree of theft resistance such that a vehicle with a higher degree of anti-theft necessity is parked in the parking spot with a higher degree of theft resistance; and automatically execute a parking instruction to cause an autonomous vehicle to automatically move in response to the parking instruction based on the assigned degree of theft resistance.

2. The automated parking management device according to claim 1, wherein the storage device further includes a registration information of the loaded vehicle, wherein the registration information includes a parking period, a vehicle line information, an anti-theft request information, and a theft history information, wherein the degree of anti-theft necessity is calculated based on at least one of the parking period, the vehicle model information, the anti-theft request information, and the theft history information.

3. An automated parking management device for managing an automated parking of a vehicle in a parking lot, the automated parking management device comprising:

a storage device that stores a map information of the parking lot and a location information of a loaded vehicle that has already been loaded in the parking lot; and a processor configured to perform an organization processing for organizing an automatic parking location of a vehicle in the parking lot, wherein, in the organization processing, the processor is configured to:

automatically calculate a degree of anti-theft necessity for the loaded vehicle for each vehicle;

automatically calculate a degree of theft resistance for each parking spot based on the map information of the parking lot and the location information of the loaded vehicle, the degree of theft resistance for each parking spot is automatically classified into four classes of the degree of the theft resistance, a first class of the degree of the theft resistance is assigned when a situation around the parking spot includes the loaded vehicle that has been loaded in all of the front, rear, left, and right directions, a second class of the degree of the theft resistance is assigned when the situation around the parking spot is that the loaded vehicle is parked in the front and rear direction, or in the left and right direction within a predetermined distance from the parking spot, a third class of the degree of the theft resistance is assigned when the situation around the parking spot includes the loaded vehicle that has been parked and is at the predetermined distance or greater in a lateral direction, and a fourth class of the degree of the theft resistance is assigned when the situation around the parking spot is such that the loaded vehicle is parked only in one of the front, rear, left, and right directions, or is not parked in any of the front and rear directions;

automatically determine an automated parking location of the loaded vehicle based on the degree of anti-theft necessity and degree of theft resistance such that a vehicle with a higher degree of anti-theft necessity is parked in the parking spot with a higher degree of theft resistance; and automatically execute a parking instruction to cause an autonomous vehicle to move in response to the parking instruction based on the assigned degree of theft resistance.

4. An automated parking management method for managing an automated parking of a vehicle in a parking lot, wherein the automated parking management method includes performing an organization processing for organizing an automated parking location of a vehicle in the parking lot, wherein, in the organization processing, the automated parking management method comprising:

automatically calculating a degree of anti-theft necessity for the loaded vehicle and the load scheduled vehicle for each vehicle;

automatically calculating a degree of theft resistance for each parking spot based on the map information of the parking lot, the location information of the loaded vehicle, and the location information of the load scheduled vehicle, the degree of theft resistance for each parking spot is automatically classified into four classes of the degree of the theft resistance, a first class of the degree of the theft resistance is assigned when a situation around the parking spot includes the loaded vehicle that has been loaded in all of the front, rear, left, and right directions, a second class of the degree of the theft resistance is assigned when the situation around the parking spot is that the loaded vehicle is parked in the front and rear direction, or in the left and right direction within a predetermined distance from the parking spot, a third class of the degree of the theft resistance is assigned when the situation around the parking spot includes the loaded vehicle that has been parked and is at the predetermined distance or greater in a lateral direction, and a fourth class of the degree of the theft resistance is assigned when the situation around the parking spot is such that the loaded vehicle is parked only in one of the front, rear, left, and right directions, or is not parked in any of the front and rear directions;

automatically determining an automated parking location of the loaded vehicle and the load scheduled vehicle based on the degree of anti-theft necessity and degree of theft resistance such that a vehicle with a higher degree of anti-theft necessity is parked in the parking spot with a higher degree of theft resistance; and automatically executing a parking instruction to cause an autonomous vehicle to automatically move in response to the parking instruction based on the assigned degree of theft resistance.

5. An automated parking management method for managing an automated parking of a vehicle in a parking lot, wherein the automated parking management method includes performing an organization processing for organizing an automated parking location of a vehicle in the parking lot, wherein, in the organization processing, the automated parking management method comprising:

automatically calculating a degree of anti-theft necessity for the loaded vehicle for each vehicle;

automatically calculating a degree of theft resistance for each parking spot based on the map information of the parking lot and the location information of the loaded vehicle, the degree of theft resistance for each parking spot is automatically classified into four classes of the degree of the theft resistance, a first class of the degree of the theft resistance is assigned when a situation around the parking spot includes the loaded vehicle that has been loaded in all of the front, rear, left, and right directions, a second class of the degree of the theft resistance is assigned when the situation around the parking spot is that the loaded vehicle is parked in the front and rear direction, or in the left and right direction within a predetermined distance from the parking spot, a third class of the degree of the theft resistance is assigned when the situation around the parking spot includes the loaded vehicle that has been parked and is at the predetermined distance or greater in a lateral direction, and a fourth class of the degree of the theft resistance is assigned when the situation around the parking spot is such that the loaded vehicle is parked only in one of the front, rear, left, and right directions, or is not parked in any of the front and rear directions;

automatically determining an automated parking location of the loaded vehicle based on the degree of anti-theft necessity and degree of theft resistance such that a vehicle with a higher degree of anti-theft necessity is parked in the parking spot with a higher degree of theft resistance; and automatically executing a parking instruction to cause an autonomous vehicle to automatically move in response to the parking instruction based on the assigned degree of theft resistance.

* * * * *